(12) United States Patent
Wu

(10) Patent No.: US 9,371,082 B1
(45) Date of Patent: Jun. 21, 2016

(54) ROTATING POSITIONING MEMBER OF FRONT WHEEL OF GOLF TROLLEY

(71) Applicant: SPORTS WORLD ENTERPRISE CO., LTD., Tainan (TW)

(72) Inventor: Fang-Li Wu, Tainan (TW)

(73) Assignee: Sport World Enterprise Co., Ltd., Tainan (TW)

( * ) Notice: Subject to any disclaimer, the term of this patent is extended or adjusted under 35 U.S.C. 154(b) by 0 days.

(21) Appl. No.: 14/921,031

(22) Filed: Oct. 23, 2015

(51) Int. Cl.
*B62B 3/02* (2006.01)

(52) U.S. Cl.
CPC ............... *B62B 3/022* (2013.01); *A63B 55/60* (2015.10)

(58) Field of Classification Search
CPC .......... B62B 3/02; B62B 3/022; A63B 55/60
See application file for complete search history.

(56) References Cited

U.S. PATENT DOCUMENTS

| | | | | |
|---|---|---|---|---|
| 8,439,390 B2* | 5/2013 | Zhang | ................... | B62B 3/02 280/47.34 |
| 8,500,140 B1* | 8/2013 | Liao | ................... | B62B 7/10 280/38 |
| 2003/0201627 A1* | 10/2003 | Lin | ................... | B62B 1/002 280/651 |
| 2006/0192366 A1* | 8/2006 | Kimberley | ............ | B62B 3/12 280/651 |
| 2009/0066056 A1* | 3/2009 | Liao | ................... | B62B 3/02 280/297 |
| 2009/0115168 A1* | 5/2009 | Liao | ................... | B62B 3/02 280/651 |
| 2009/0295219 A1* | 12/2009 | Wu | ................... | B60B 3/001 301/111.01 |
| 2010/0059948 A1* | 3/2010 | Liao | ................... | B62B 3/02 280/42 |
| 2010/0176577 A1* | 7/2010 | Liao | ................... | B62B 3/02 280/651 |
| 2010/0225093 A1* | 9/2010 | Lin | ................... | B62B 3/02 280/642 |
| 2011/0316258 A1* | 12/2011 | Lin | ................... | B62B 3/02 280/651 |
| 2012/0025481 A1* | 2/2012 | Wu | ................... | B62B 3/02 280/38 |
| 2012/0086189 A1* | 4/2012 | Wu | ................... | B62B 3/02 280/651 |
| 2012/0261908 A1* | 10/2012 | Liao | ................... | B62B 3/12 280/651 |
| 2012/0306182 A1* | 12/2012 | Liao | ................... | B62B 3/02 280/651 |
| 2013/0093165 A1* | 4/2013 | Liao | ................... | B62B 3/02 280/651 |
| 2013/0257019 A1* | 10/2013 | Eisinger | ............... | B62B 7/06 280/650 |
| 2013/0300090 A1* | 11/2013 | Wang | ................. | B62B 5/0433 280/651 |
| 2014/0232077 A1* | 8/2014 | Zhang | ................ | B62B 3/12 280/47.34 |
| 2014/0333049 A1* | 11/2014 | Wu | ................... | A63B 55/08 280/651 |
| 2015/0054239 A1* | 2/2015 | Stewart | ............... | B62B 3/022 280/38 |
| 2015/0251065 A1* | 9/2015 | Wu | ................... | B62B 3/02 280/149.1 |
| 2015/0291200 A1* | 10/2015 | Taylor | ................. | B62B 7/10 280/642 |

* cited by examiner

*Primary Examiner* — Jeffrey J Restifo
*Assistant Examiner* — Erez Gurari
(74) *Attorney, Agent, or Firm* — Rosenberg, Klein & Lee

(57) ABSTRACT

A rotating positioning member of a front wheel of a golf trolley is revealed. A front wheel set is disposed at a front end of a lower frame and including a front wheel base fixed on the lower frame, a front wheel frame, and a front wheel pivotally connected to the front wheel frame. The front wheel base is mounted with an inclined guide slot. A connecting rod is formed on the front wheel frame and pivotally connected to the inclined guide slot. Thus the connecting rod drives the front wheel frame to rotate 90 degrees and the front wheel frame further drives the front wheel to horizontally lean against the lower frame when the front wheel frame is rotated toward the lower frame in the inclined guide slot due to the connecting rod. Thus the golf trolley is easy to fold up for storage.

5 Claims, 10 Drawing Sheets

ROTATING POSITIONING MEMBER OF FRONT WHEEL OF GOLF TROLLEY

BACKGROUND OF THE INVENTION

1. Field of the Invention

The present invention relates to a rotating positioning member of a front wheel of a golf trolley, especially to a rotating positioning member of a front wheel of a golf trolley by which the volume of the front wheel is reduced significantly after being folded so that less space is required for storage of the golf trolley. The golf trolley is easy to fold up for storage.

2. Descriptions of Related Art

Golf is popular with people of all ages due to its skills, interest, and slow movement around the golf course. Most of golf courses are designed according to natural landforms. For example, there are various golf courses including mountain golf courses, woods golf courses, river golf courses, hill golf courses, etc. While walking around the golf course and being immersed in the nature, people feel relaxed and comfortable. The versatile designs of the golf course also increase challenge of the sport. In order to overcome the challenge of the golf course, people not only need to practice the skills required but also get to have different golf clubs for proper drive in varied landscapes of the golf course. The golf players typically transport golf clubs in a golf bag due to the weight of the golf clubs.

The golf bag causes the burden on the player or caddy. Thus a golf trolley has been invented to provide an energy-saving and easy way for carrying the heavy golf clubs. The golf trolley has a certain volume for loading the golf clubs in the gold bag and the golf balls. Thus the storage of the golf trolley is quite inconvenient. In order to solve the problem, a golf trolley that folds down to a smaller size has been developed.

However, the golf trolley that folds down to a smaller size still has its limits. While in use, a front wheel of the golf trolley is directly folded backward and the direction of the front wheel remains. The folded front wheel is perpendicular to the ground and having a certain height. Thus the reduced volume of the front wheel still occupies a certain space and the storage of the golf trolley is inconvenient.

There is room for improvement and a need to provide a novel structure of a rotating positioning member of a front wheel of a golf trolley.

SUMMARY OF THE INVENTION

Therefore it is a primary object of the present invention to provide a rotating positioning member of a front wheel of a golf trolley by which the front wheel is rotated and horizontally leaning against a lower frame of a trolley frame after being driven by a front wheel frame to move toward an inner side of the lower frame of the trolley frame. Thus the volume is reduced after the front wheel being folded and less space is required for storage. The golf trolley is easy and convenient to fold up for storage.

In order to achieve the above object, a front wheel set is arranged at a front end of a lower frame of a trolley frame.

The front wheel set is composed of a front wheel base fixed on a front end of the lower frame, a front wheel frame set correspondingly to the front wheel base, and a front wheel pivotally connected to the front wheel frame. An inclined guide slot is formed on a bottom of the front wheel base. A connecting rod is formed on the front wheel frame and corresponding to the inclined guide slot. The connecting rod is pivotally connected to the inclined guide slot. Thus the connecting rod drives the front wheel frame to rotate 90 degrees and the front wheel frame further drives the front wheel to lean against the lower frame horizontally (parallel to the ground) when the front wheel frame is rotated toward an inner side of the lower frame in the inclined guide slot due to the connecting rod.

The connecting rod is pivotally connected to the inclined guide slot by a pivot block and a pivot shaft.

A front end and a rear end of the inclined guide slot are a front positioning slot and a rear positioning slot respectively formed on the front wheel base. A long slot is mounted on the connecting rod of the front wheel frame. A sliding block is disposed in the connecting rod while an elastic part is against between the sliding block and an inner end of the connecting rod. A turning member is fitted over the connecting rod while the positioning rod is passed through a reinforcing sleeve, the turning member and the long slot on the connecting rod to be connected to and fixed on the sliding block. The positioning rod can be mounted and positioned in either the front positioning slot or the rear positioning slot.

The trolley frame further includes an upper frame pivotally connected to the lower frame and a fixing rod is set on the upper frame. A mounting slot is formed on a front end of the front wheel base. The fixing rod is mounted and positioned in the mounting slot when the upper frame is folded.

An upper frame is pivotally connected to the lower frame of the trolley frame and a handle is pivotally connected to a top end of the upper frame; a carry grip is arranged at the handle and located closer to the upper frame.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
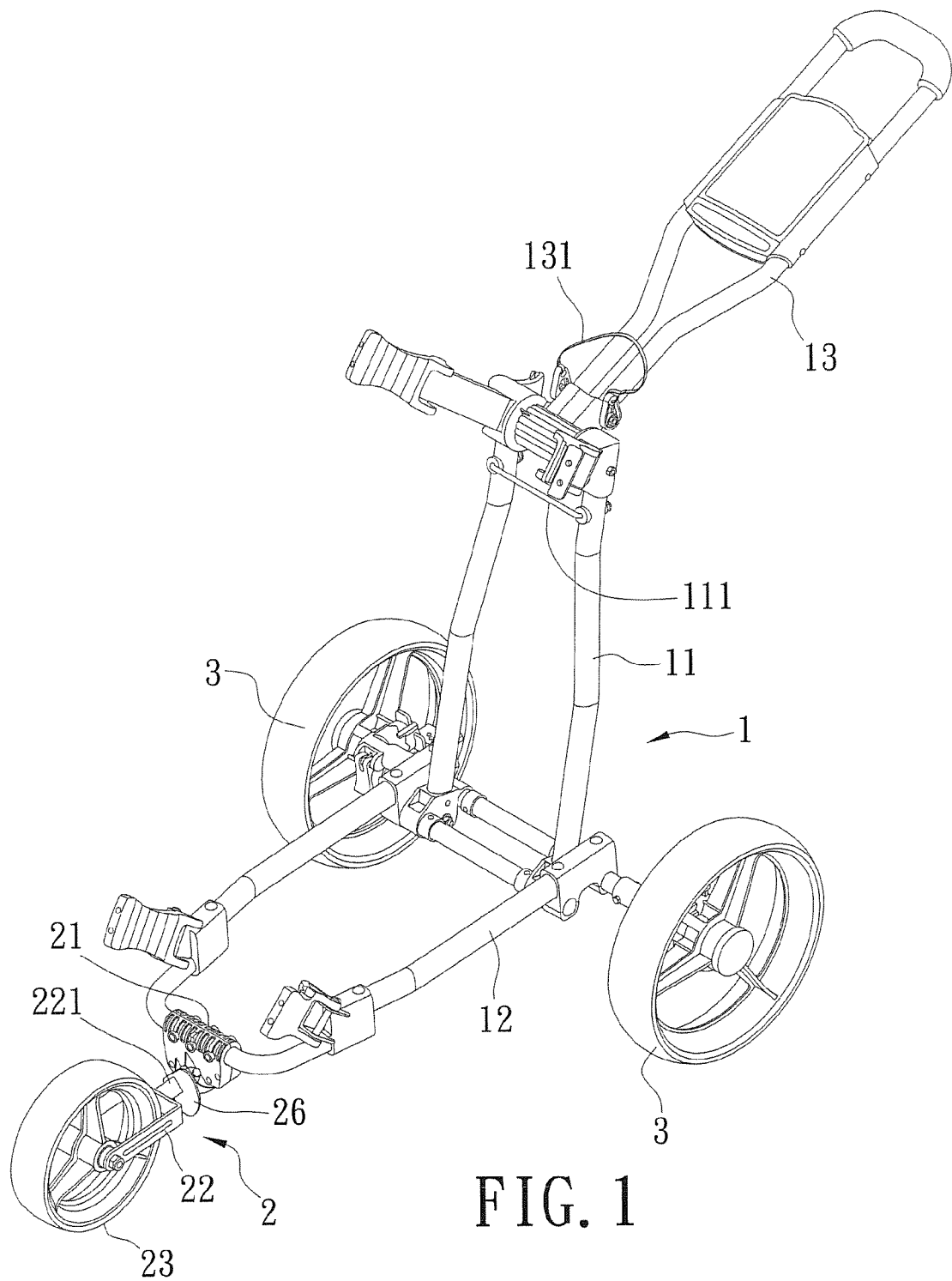
FIG. 1 is a perspective view of an embodiment in use according to the present invention.
Figure 2:
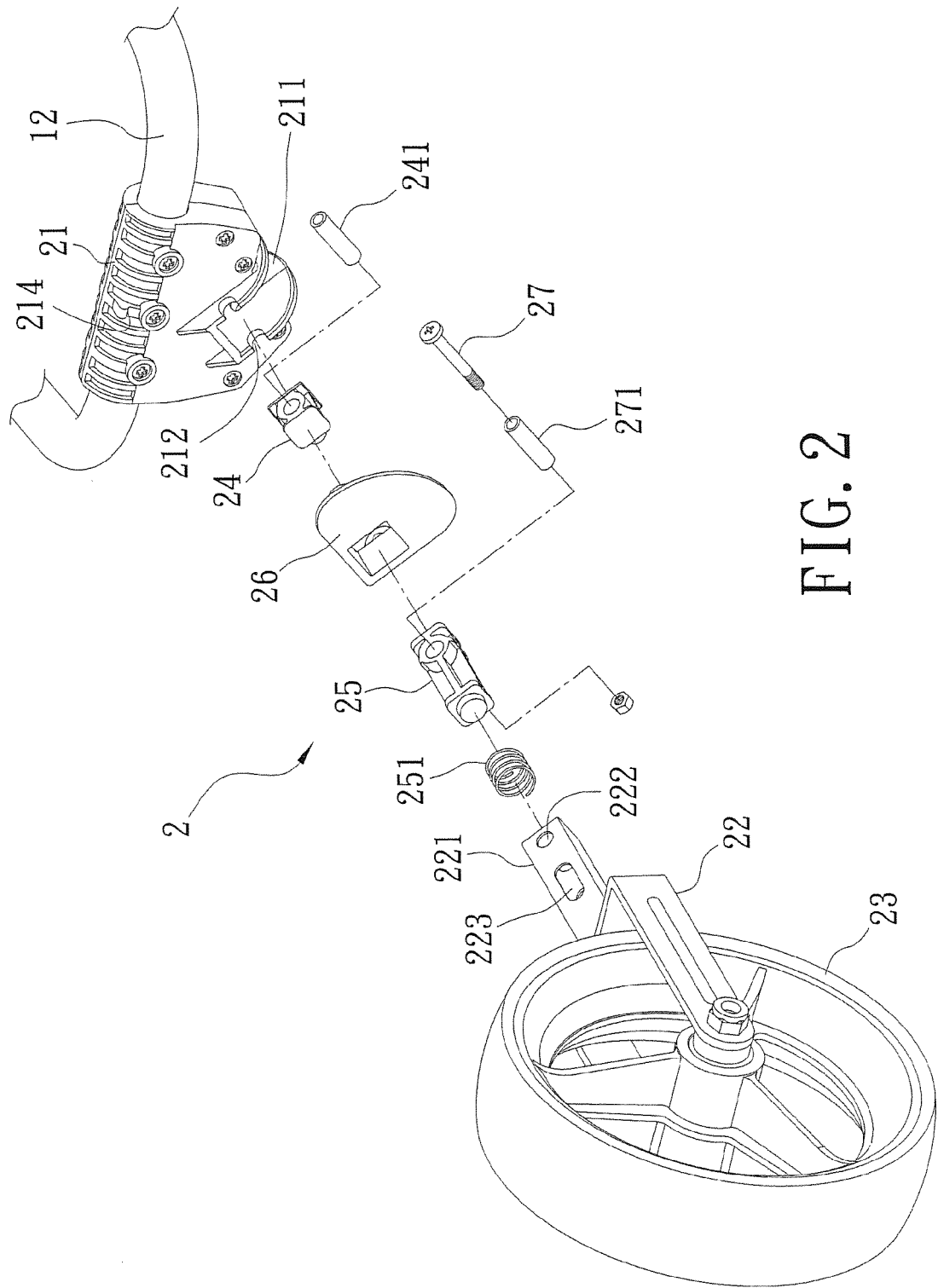
FIG. 2 is a partial explosive view of an embodiment according to the present invention.
Figure 3:
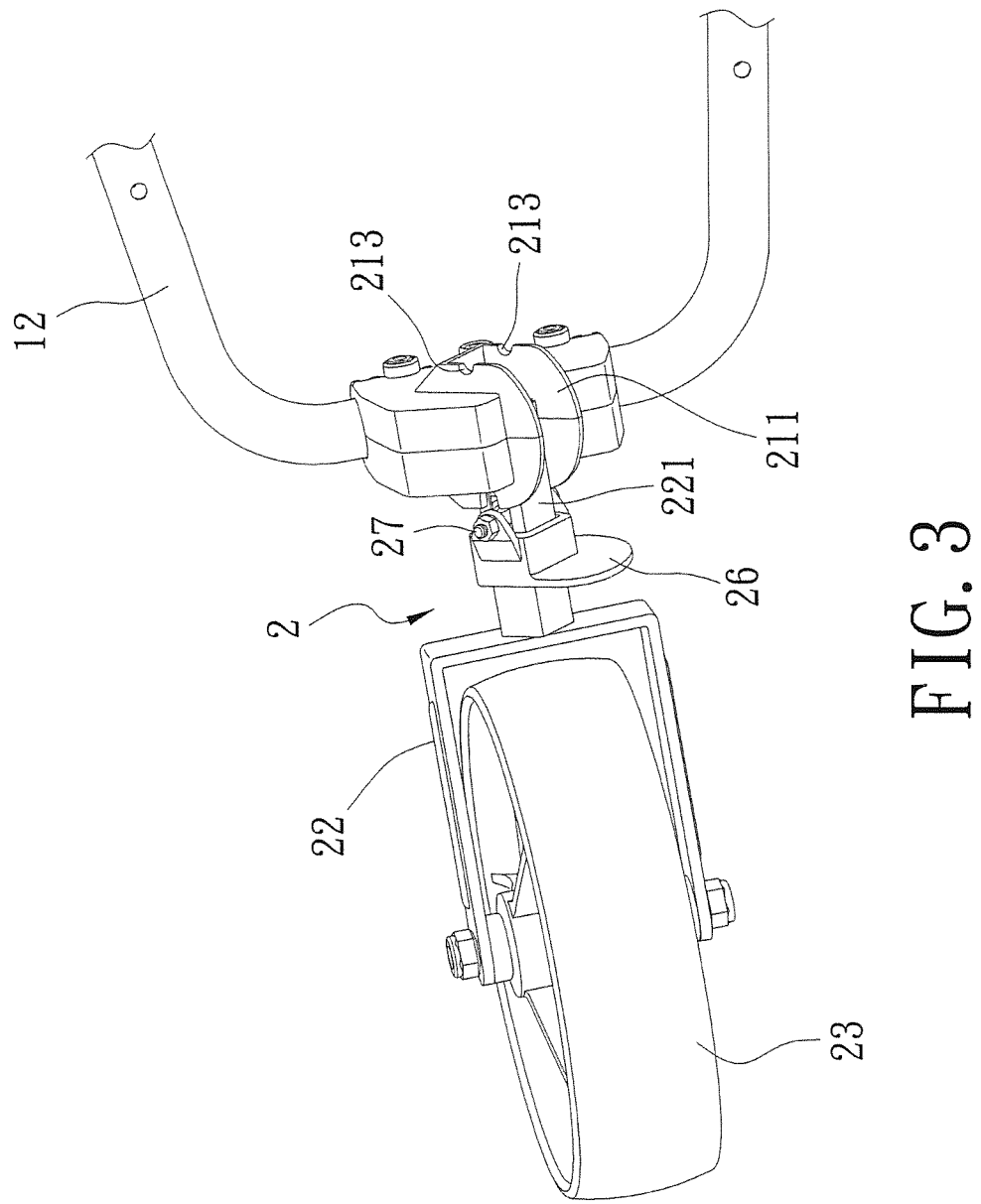
FIG. 3 is a bottom view of an embodiment according to the present invention.

Refer to FIG. 1, a golf trolley of the present invention includes a trolley frame 1, a front wheel set 2 and two rear wheels 3. The trolley frame 1 is formed by an upper frame 11, a lower frame 12 and a handle 13. A bottom end of the upper frame 11 is pivotally connected to the lower frame 12 and a fixing rod 111 is disposed on an upper part of the upper frame 11 while the handle 13 is pivotally connected to a top end of the upper frame 11. The handle 13 includes a carry grip 131 arranged closer to the upper frame 11. The front wheel set 2 is set on a front end of the lower frame 12 while the two rear wheels 3 are arranged at two sides on a rear end of the lower frame 12 respectively.

Refer from FIG. 1 to FIG. 4, the front wheel set 2 consists of a front wheel base 21 fixed on a front end of the lower frame 12, a front wheel frame 22 set in front of the front wheel base 21, a front wheel 23 pivotally connected to the front wheel frame 22, a pivot block 24, a sliding block 25, a turning member 26 and a positioning rod 27. An inclined guide slot 211 is formed on a bottom of the front wheel base 21. A front positioning slot 212 and a rear positioning slot 213 are respectively formed on the front wheel base 21 and corresponding to a front end and a rear end of the inclined guide slot 211. A mounting slot 214 is formed on a front end of the front wheel base 21. The front wheel frame 22 is composed of a connecting rod 221, a pivot hole 222 and a long slot 223. The pivot hole 222 and the long slot 223 are mounted on and penetrating two sides of the connecting rod 221. The connecting rod 221 is corresponding to the inclined guide slot 211. The pivot block 24 is fitted over the connecting rod 221 and a pivot shaft 241 is passed through the pivot hole 222 and the pivot block 24 to be pivotally connected to the inclined guide slot 211. The sliding block 25 is disposed in the connecting rod 221 while an elastic part 251 is against between the sliding block 25 and an inner end of the connecting rod 221. The turning member 26 is fitted over the connecting rod 221 while the positioning rod 27 is passed through a reinforcing sleeve 271, the turning member 26 and the long slot 223 on the connecting rod 221 to be connected to and fixed on the sliding block 25. The positioning rod 27 can be mounted and positioned in either the front positioning slot 212 or the rear positioning slot 213.

Figure 4:
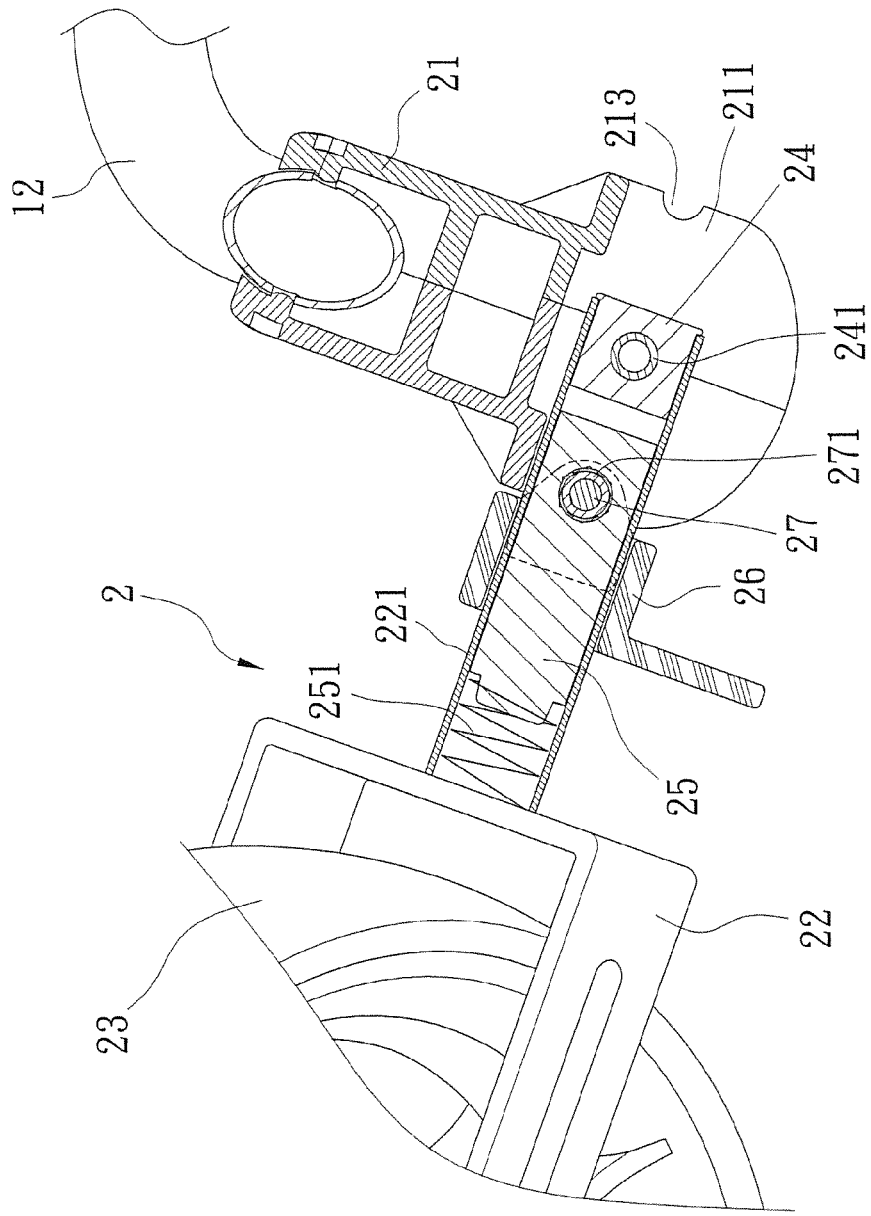
FIG. 4 is a schematic drawing showing a partial longitudinal section of an embodiment according to the present invention.

When users intend to extend the front wheel frame 22 of the front wheel set 2, a force is applied to pull the turning member 26. The turning member 26 further drives the positioning rod 27, the reinforcing sleeve 271 and the sliding block 25 to move within the long slot 223 on the connecting rod 221 of the front wheel frame 22. The connecting rod 221 of the front wheel frame 22 is rotating around the pivot shaft 241 within the inclined guide slot 211 of the front wheel base 21, as shown in FIG. 4. Thus the front wheel frame 22 drives the front wheel 23 to move away from the lower frame 12 of the trolley frame 1. After the front wheel frame 22 being extended, no more force is applied to the turning member 26. The elastic part 251 turns the sliding block 25 back to the original position. During the movement of the sliding block 25, the sliding block 25 also drives the turning member 26, the positioning rod 27 and the reinforcing sleeve 271 to move back and get positioned. Thus the positioning rod 27 is mounted and positioned in the front positioning slot 212 of the front wheel base 21.

Figure 5:
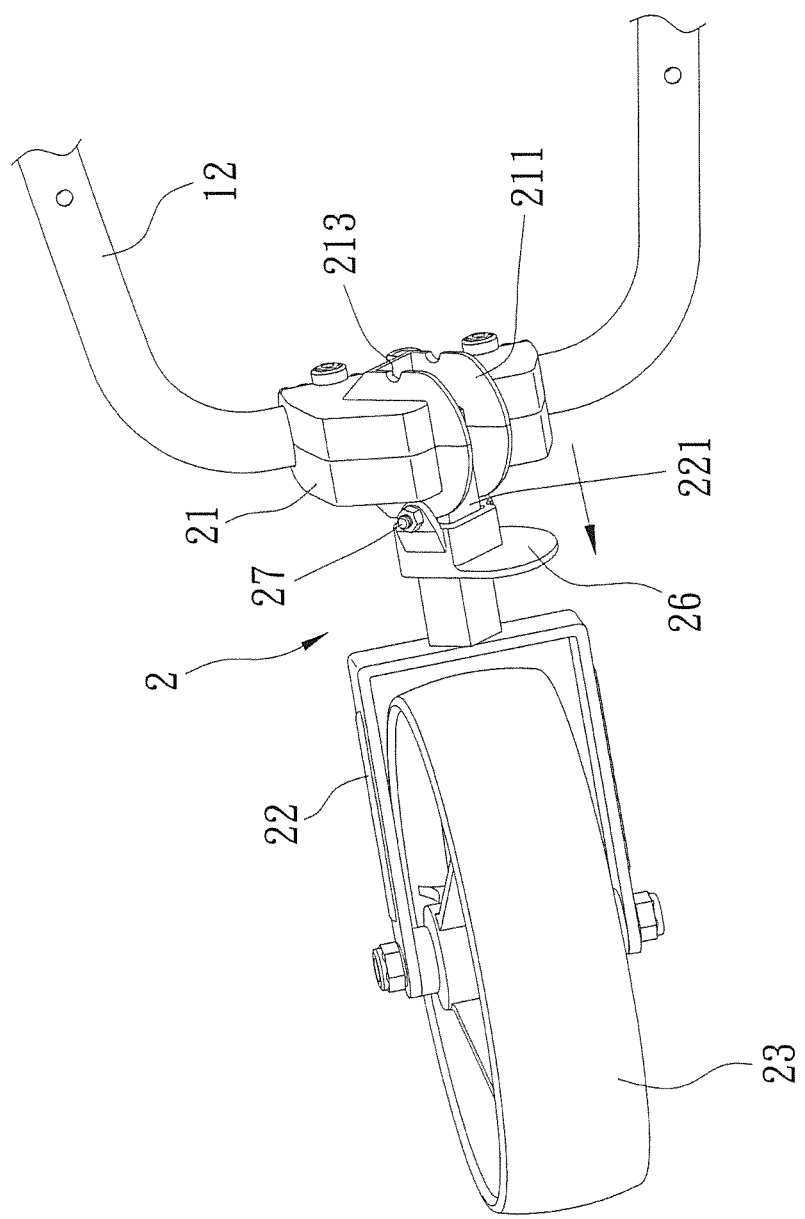
FIG. 5 is a schematic drawing showing an embodiment being folded for storage according to the present invention.
Figure 6:
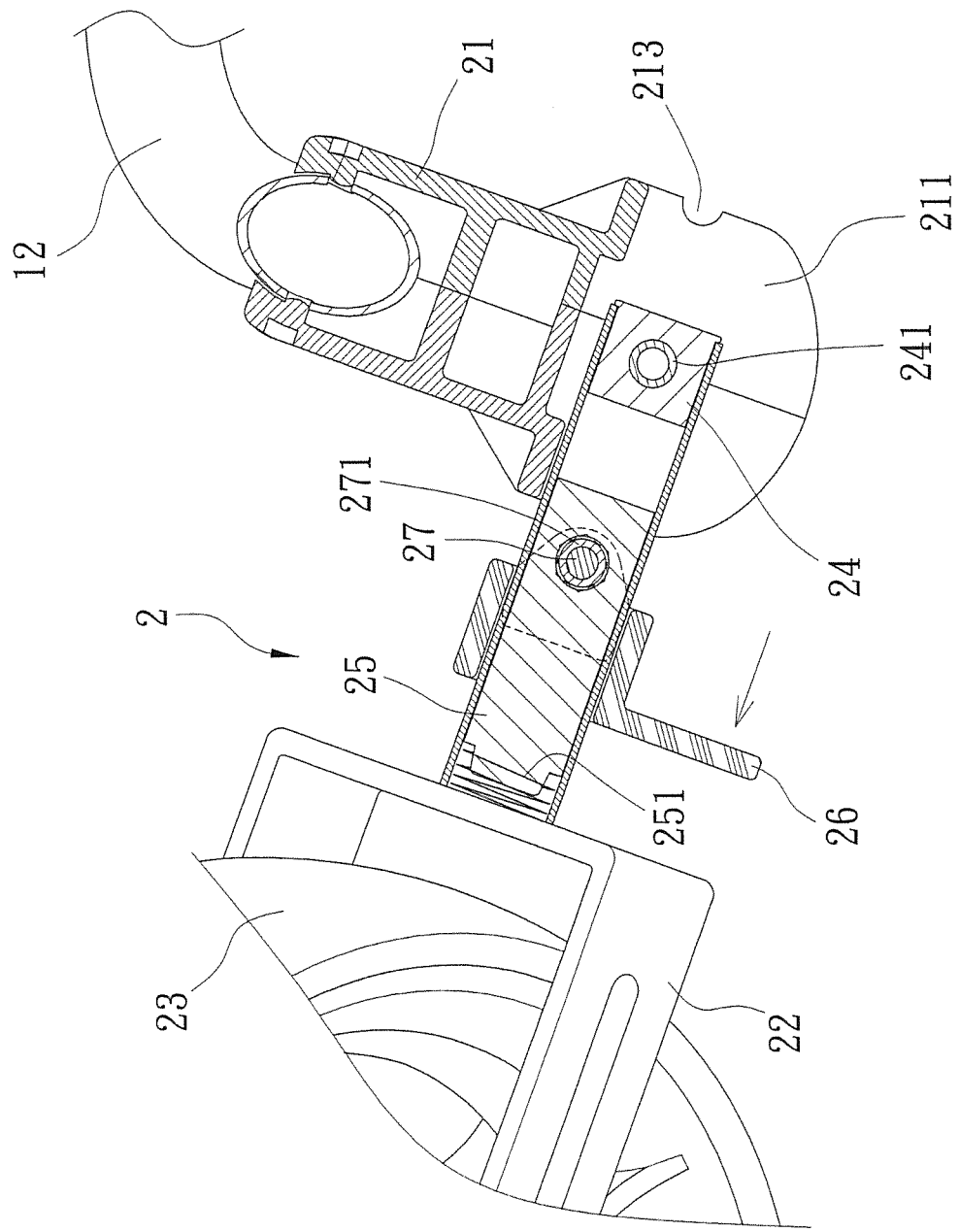
FIG. 6 is a longitudinal sectional view of an embodiment being folded for storage according to the present invention.
Figure 7:
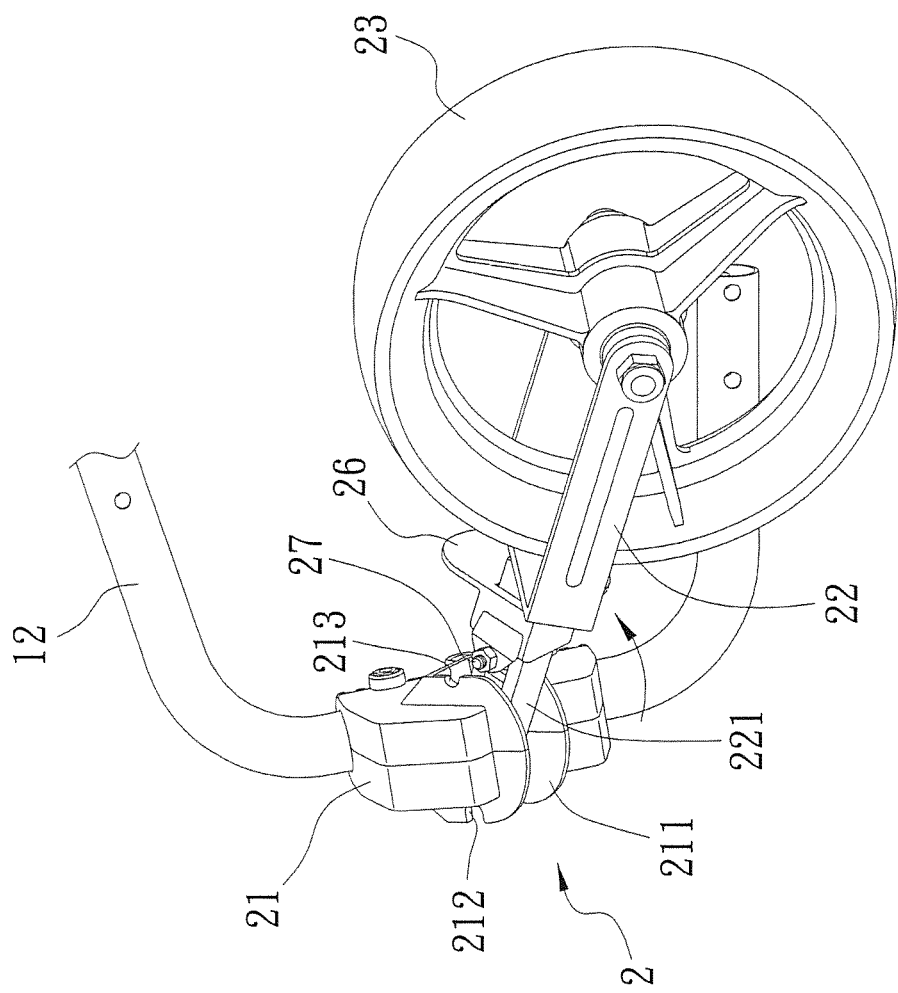
FIG. 7 is another schematic drawing showing an embodiment being folded for storage according to the present invention.
Figure 8:
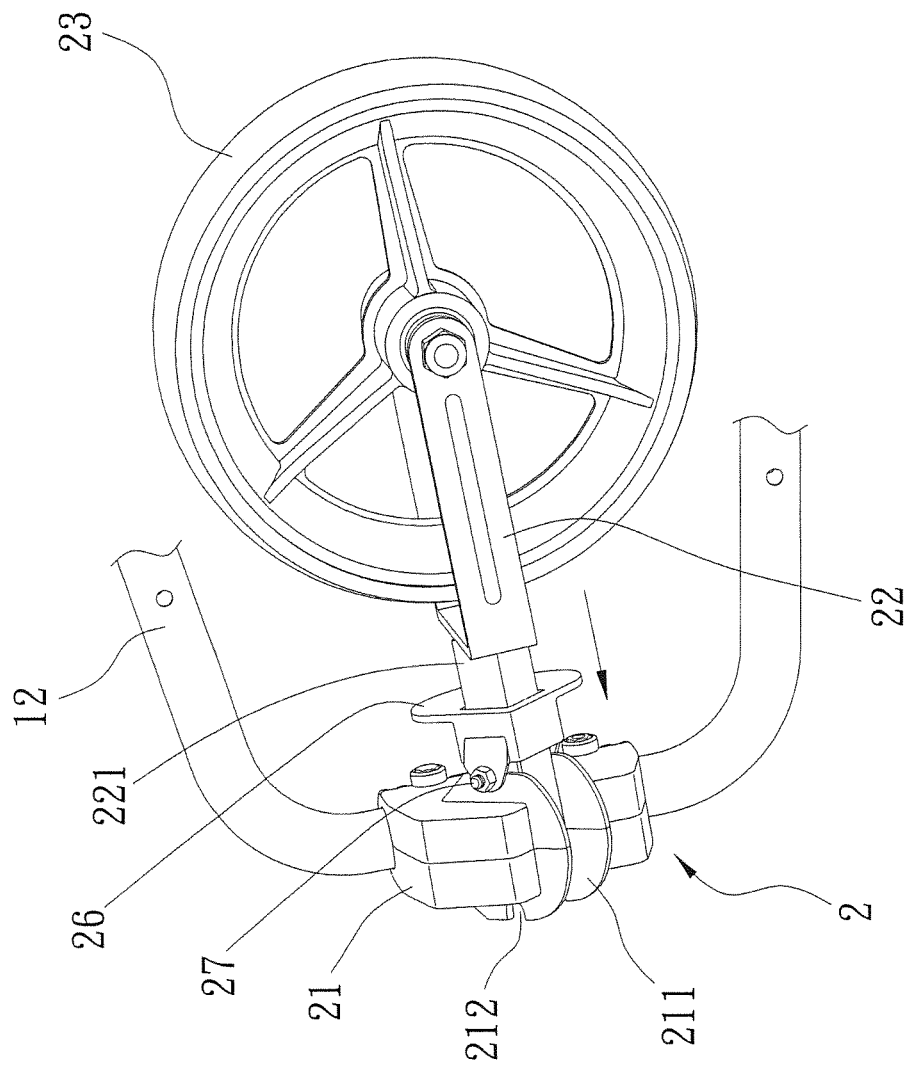
FIG. 8 is a further schematic drawing showing an embodiment being folded for storage according to the present invention.

Refer to FIG. 5 and FIG. 6, a force is also applied to pull the turning member 26 when users want to fold the front wheel frame 22 for storage. The turning member 26 further drives the positioning rod 27, the reinforcing sleeve 271 and the sliding block 25 to move within the long slot 223 on the connecting rod 221 of the front wheel frame 22. Thus the positioning rod 27 is released from the front positioning slot 212 of the front wheel base 21. Thus the connecting rod 221 of the front wheel frame 22 is rotating around the pivot shaft 241 within the inclined guide slot 211 of the front wheel base 21. And the front wheel frame 22 is driven to move toward an inner side of the lower frame 12 of the trolley frame 1. Refer to FIG. 7 and FIG. 8, the inclined guide slot 211 of the front wheel base 21 is arranged in an inclined manner. During rotation of the connecting rod 221 in the inclined guide slot 211, the connecting rod 221 drives the front wheel frame 22 to rotate 90 degrees. Thus the front wheel 23 is leaning against the lower frame 12 horizontally (parallel to the ground) after being driven by the front wheel frame 22 to move toward the inner side of the lower frame 12. After the folding, no more force is applied to the turning member 26. The elastic part 251 pushes the sliding block 25 back to the original position and allows the sliding block 25 got positioned. During the movement of the sliding block 25, the sliding block 25 also drives the turning member 26, the positioning rod 27 and the reinforcing sleeve 271 to turn back and get positioned. Thus the positioning rod 27 is mounted and positioned in the rear positioning slot 213 of the front wheel base 21.

Figure 9:
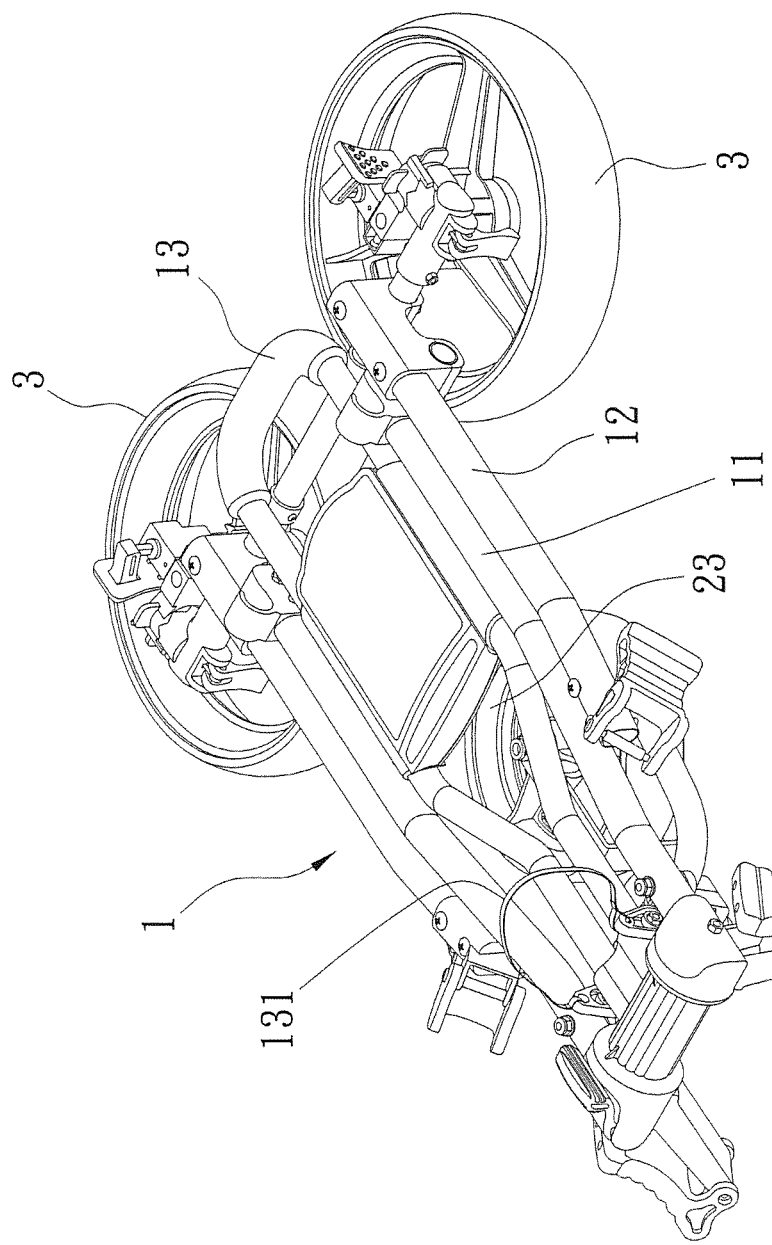
FIG. 9 is a perspective view of an embodiment being folded for storage according to the present invention.
Figure 10:
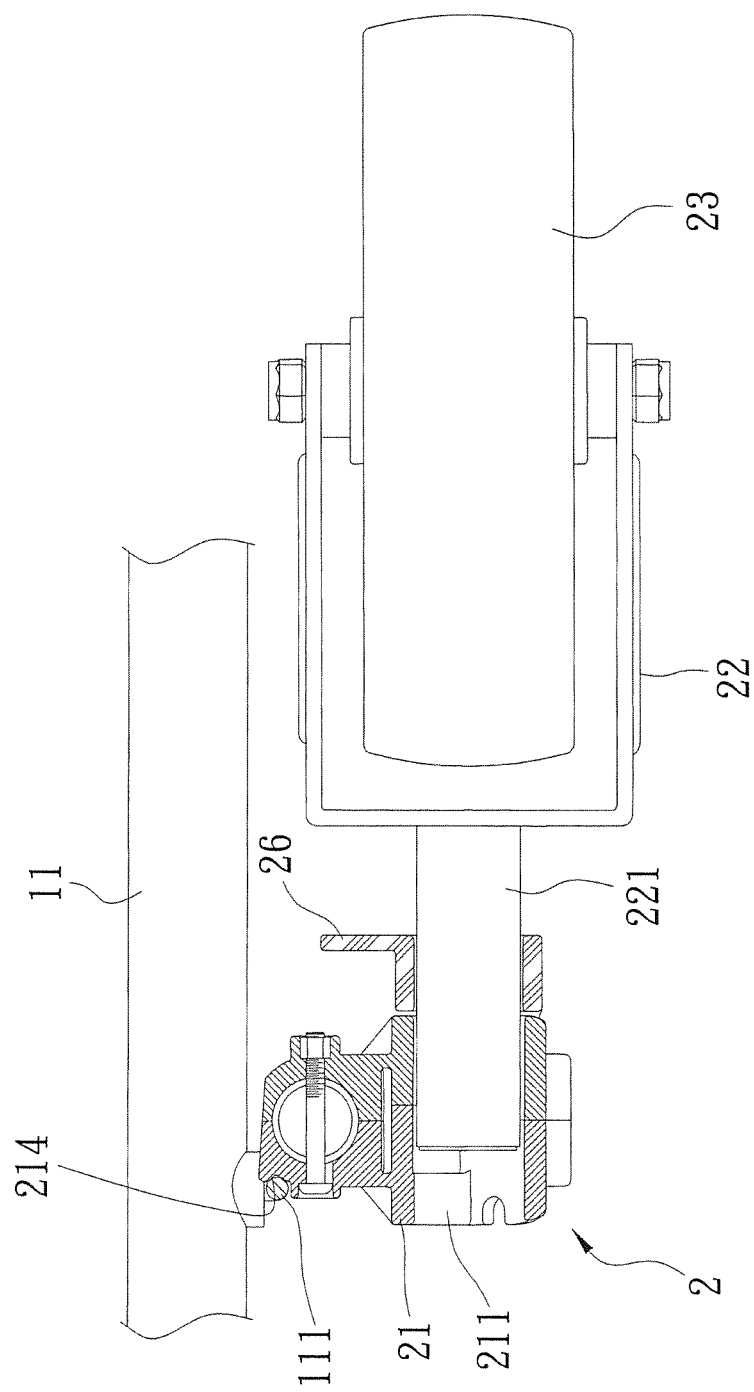
FIG. 10 is a partial enlarged cross sectional view of an embodiment being folded for storage according to the present invention.

Refer to FIG. 9, after the front wheel frame 22 being folded, the rear wheels 3 are also folded horizontally to lean against the lower frame 12. Then the upper frame 11 is folded toward and getting closer the lower frame 12. The fixing rod 111 of the upper frame 11 is mounted and positioned in the mounting slot 214 on the front end of the front wheel base 21, as shown in FIG. 10. Next the handle 13 is also folded to lean against the upper frame 11. Thus the volume of the whole golf trolley is minimized and the compact volume allows portability and easy storage. For easy transportation, users can hold the carry grip 131 of the handle 13 to move the golf trolley.

In summary, the front wheel of the present invention is horizontally leaning against the lower frame of the trolley frame after being driven by the front wheel frame of the front wheel set to move toward the inner side of the lower frame. Thus the volume is reduced after the front wheel being folded, less space is required for storage of the golf trolley.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A rotating positioning member of a front wheel of a golf trolley comprising a front wheel set disposed on and connected to a front end of a lower frame of a trolley frame;

wherein the front wheel set includes a front wheel base fixed on a front end of the lower frame, a front wheel frame set correspondingly to the front wheel base, and a front wheel pivotally connected to the front wheel frame; an inclined guide slot is formed on a bottom of the front wheel base while a connecting rod is formed on the front wheel frame and corresponding to the inclined guide slot; the connecting rod is pivotally connected to the inclined guide slot so that the connecting rod drives the front wheel frame to rotate 90 degrees and the front wheel frame further drives the front wheel to horizontally lean against the lower frame when the front wheel frame is rotated toward an inner side of the lower frame in the inclined guide slot due to the connecting rod.

2. The device as claimed in claim 1, wherein the connecting rod is pivotally connected to the inclined guide slot by a pivot block and a pivot shaft.

3. The device as claimed in claim 1, wherein a front positioning slot and a rear positioning slot are respectively formed on the front wheel base and corresponding to a front end and a rear end of the inclined guide slot; a long slot is mounted on the connecting rod of the front wheel frame; a sliding block is disposed in the connecting rod while an elastic part is against between the sliding block and an inner end of the connecting rod; a turning member is fitted over the connecting rod while a positioning rod is passed through a reinforcing sleeve, the turning member and the long slot on the connecting rod to be connected to and fixed on the sliding block; the positioning rod is able to be mounted and positioned in either the front positioning slot or the rear positioning slot.

4. The device as claimed in claim 1, wherein an upper frame is pivotally connected to the lower frame of the trolley frame and a fixing rod is disposed on the upper frame; a mounting slot is formed on a front end of the front wheel base; the fixing rod is mounted and positioned in the mounting slot when the upper frame is folded.

5. The device as claimed in claim 1, wherein an upper frame is pivotally connected to the lower frame of the trolley frame and a handle is pivotally connected to a top end of the upper frame; a carry grip is arranged at the handle and located closer to the upper frame.

\* \* \* \* \*